United States Patent [19]
Flotow et al.

[11] Patent Number: 4,762,215
[45] Date of Patent: Aug. 9, 1988

[54] BRAKE TORQUE LIMITING COUPLING

[75] Inventors: Richard A. Flotow, Ft. Wayne; William H. Sink, Auburn, both of Ind.

[73] Assignee: Dana Corporation, Toledo, Ohio

[21] Appl. No.: 318,729

[22] Filed: Nov. 6, 1981

[51] Int. Cl.⁴ .............. F16D 11/00; F16D 13/60
[52] U.S. Cl. ................................ 192/107 C; 192/7; 192/70.19
[58] Field of Search ........... 192/107 C, 109 D, 70.2, 192/107 M, 18 R

[56] References Cited

U.S. PATENT DOCUMENTS 1,855,899  4/1932  Barclay .................... 192/70.19
2,117,728  5/1938  Katcher .................... 192/107 C
2,264,192  11/1941 Wellman .................... 192/107 C
3,016,119  1/1962  Rosenberger et al. ....... 192/107 C
3,763,977  10/1973 Sink ........................ 192/7

Primary Examiner—Dirk Wright
Attorney, Agent, or Firm—Robert M. Leonardi

[57] ABSTRACT

A torque limiting clutch brake 50 has an inner brake assembly 55 and an outer cover assembly 60 mounted for relative rotation on the brake assembly. The brake assembly 55 includes a brake washer 52 adapted to be driven by a shaft, and an intermediate plate 51 connected to the brake washer by a lost motion coupling. The cover assembly includes wave washers 62 frictionally engaged with the intermediate plate 51 for torque limiting characteristics.

16 Claims, 3 Drawing Sheets

BRAKE TORQUE LIMITING COUPLING

BACKGROUND OF THE INVENTION

This invention relates generally to friction clutches used in vehicles and more particularly to clutch brakes utilized in non-synchronized heavy-duty transmissions. Such brakes are activated upon disengagement of a main clutch to retard rotation of transmission gearing for easier gear shifting.

It is well known in the art to retard vehicle transmission gears prior to gear shifting by using a clutch brake activated by a throw-out mechanism upon disengagement of the main clutch. Torque limiting clutch brakes which provide a limited amount of braking torque are also well known, are are widely preferred because of their durability and long life.

Resilient means have been used in torque limiting clutch brakes to cushion the braking effect and to prevent excessive braking pressure which may damage the clutch brake. For example, prior art devices have included opposed Belleville springs for establishing a predetermined frictional load between the inner and outer members of clutch brakes. However, clutches utilizing opposed Belleville springs must be carefully and accurately designed and assembled to evenly balance one spring against the other. An imbalance between the springs can cause one to overcome the other, flipping or reversing its concavity, thereby reducing the effectiveness and shortening the life of the clutch brake.

Prior art clutch brakes were often designed with cover assemblies which act as heat sinks for heat originating both externally and internally of the cover assembly. In such devices, excessive wear in the cover facings may result in excessive heat build up in the cover assembly which may cause premature deterioration of the friction facings.

SUMMARY OF THE INVENTION

The present invention is a more stable clutch brake which eliminates Belleville friction members and therefore avoids the Belleville flipping problem. It is also a more durable clutch brake because it has heat sink capabilities which allow the friction facings to survive longer under excessive torque conditions.

The present invention is an improved clutch brake adapted to be splined to a rotatable shaft and having a cover assembly for frictional engagement with a rotatably stationary member. The clutch brake includes a brake assembly drivingly connected to the shaft and rotatable relative to the cover assembly. The cover assembly includes an axially resilient friction member drivingly engaged with the cover assembly.

DESCRIPTION OF A PREFERRED EMBODIMENT

Figure 1:
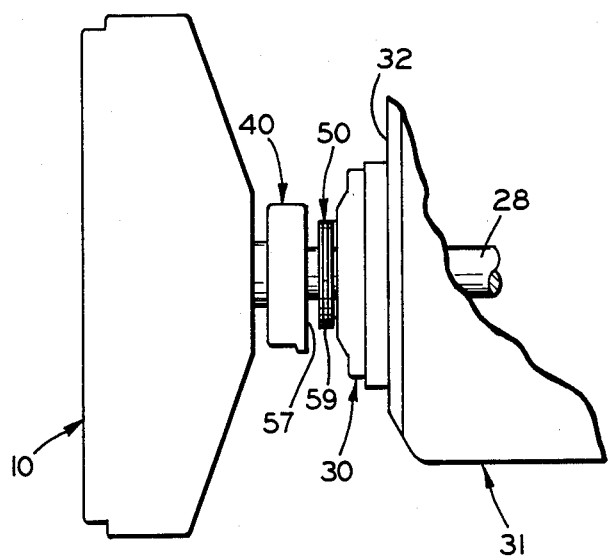
FIG. 1 is a diagrammatic side elevation of the clutch brake of the present invention in relation to cooperating structure of a vehicle.

Referring to FIG. 1, a normally engaged heavy-duty pull type friction clutch is shown generally at 10 and is for use with a non-synchronized vehicle transmission 31. The clutch utilizes a driven disc splined to a rotatable transmission main gear driven shaft 28. The driven shaft 28 is piloted at its front end in the clutch flywheel (not shown) and at its rearward end by a bearing 30 mounted in the front wall 32 of the transmission. The driven shaft 28 extends into the transmission and drives the transmission gearing.

A clutch release bearing 40 is slidably disposed about the driven shaft 28 as is well known in the art. The clutch release bearing may be operated by conventional clutch pedal linkage (not shown) which can release the clutch 10 by pulling the release bearing 40 away from the flywheel, as is well known in the art.

Figure 2:
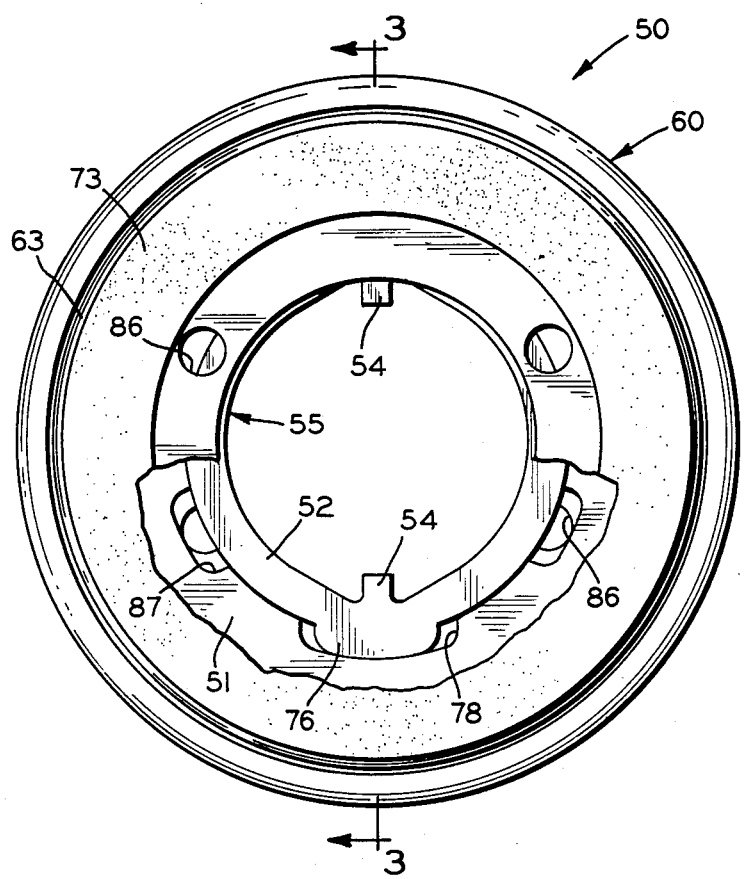
FIG. 2 is an enlarged end view of the clutch brake shown in FIG. 1 with portions broken away to more clearly illustrate certain details.

A clutch brake 50 is provided to aid in gear shifting, particularly when the vehicle is stationary, to enable a driver to shift the transmission more easily from first gear to reverse or from reverse to first gear without clashing or unduly straining the gears. The clutch brake 50 is located between the clutch release bearing 40 and the transmission bearing cap 30. As best seen in FIG. 2, the clutch brake 50 comprises an inner brake assembly 55 and an outer cover assembly 60 operatively connected for limited torque capability.

Figure 3:
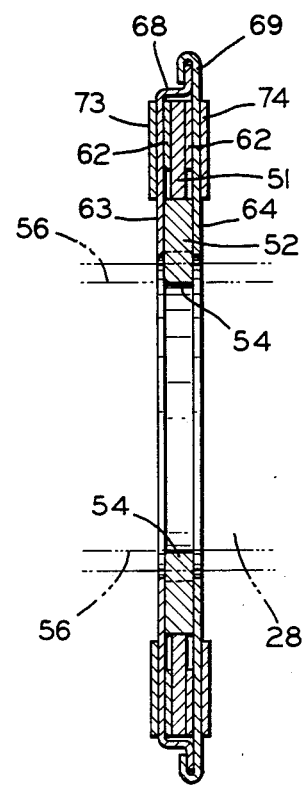
FIG. 3 is a sectional view taken substantially along line 3—3 of FIG. 2.

Referring to FIG. 3, the inner brake assembly 55 comprises an annular brake washer 52 having a pair of opposed drive tangs 54 on its inner periphery for axially slidably and circumferentially drivingly engaging opposed splines or keyways 56 on the outer periphery of the driven shaft 28. The inner brake assembly 55 also includes an intermediate plate 51 in controlled frictional driving engagement with the cover assembly 60. The intermediate plate 51 is a powdered metal ring having both friction and heat sink characteristics. A preferred intermediate plate material is an oil based powdered metal, such as SN-0205, which facilitates slippage with the friction members after a predetermined torque is reached. Of course, other oil based materials may also be used, such as glass filled teflon or other special oil based steels.

The intermediate plate 51 is drivable by the brake washer 52 through a lost motion coupling connection comprising a pair of opposed radially outwardly extending drive lugs 76 on the outer periphery of the brake washer 52 and cooperating opposed circumferentially elongated drive slots 78 in the interior of the intermediate plate 51 (See FIG. 3). Lost motion or limited rotational free travel is obtained between the brake washer 52 and plate 51 because the drive slots 78 have a greater length than the mating drive lugs 76. The lost motion connection is preferred because it allows normal driveline vibrations to occur without driving the cover assembly 60.

The cover assembly 60 includes two stamped annular covers 63 and 64, each cover having a central opening and a radially outer flange 68 and 69, respectively. The flanges 68 and 69 are rolled together, but the covers 63 and 64 could be interlocked in many other ways such as by riveting, press fitting, etc. The cover assembly is rotatably mounted on the brake washer 52 of the brake assembly.

The covers 63 and 64 have organic outer friction facings 73 and 74, respectively, on opposite sides of the cover assembly. The facings may be bound to the covers in any of several ways well known in the art. The outer friction facings 73 and 74 are positioned for frictional engagement with friction surfaces 57 and 59 (FIG. 1), respectively, on the release bearing 40 and bearing cap 30, respectively.

The cover assembly includes two axially resilient friction members 62 illustrated in a fully compressed state in FIG. 2. The axially resilient friction members comprise a pair of substantially identical, opposed wave washers 62 positioned between the covers 63 and 64 and on either side of the intermediate plate 51. The covers 63 and 64 positively retain the opposed wave washers 62 in a pre-loaded condition, thereby providing a compact unitary clutch brake. Identical opposed resilient springs are preferred for balance and even wear characteristics. However, a single axially resilient friction member could be used. The wave washers 62 are made of spring steel and are designed for a controlled frictional driving engagement with the intermediate plate 51 and a positive driving connection with the cover assembly 60, thereby providing limited torque characteristics in the clutch brake.

Figure 4:
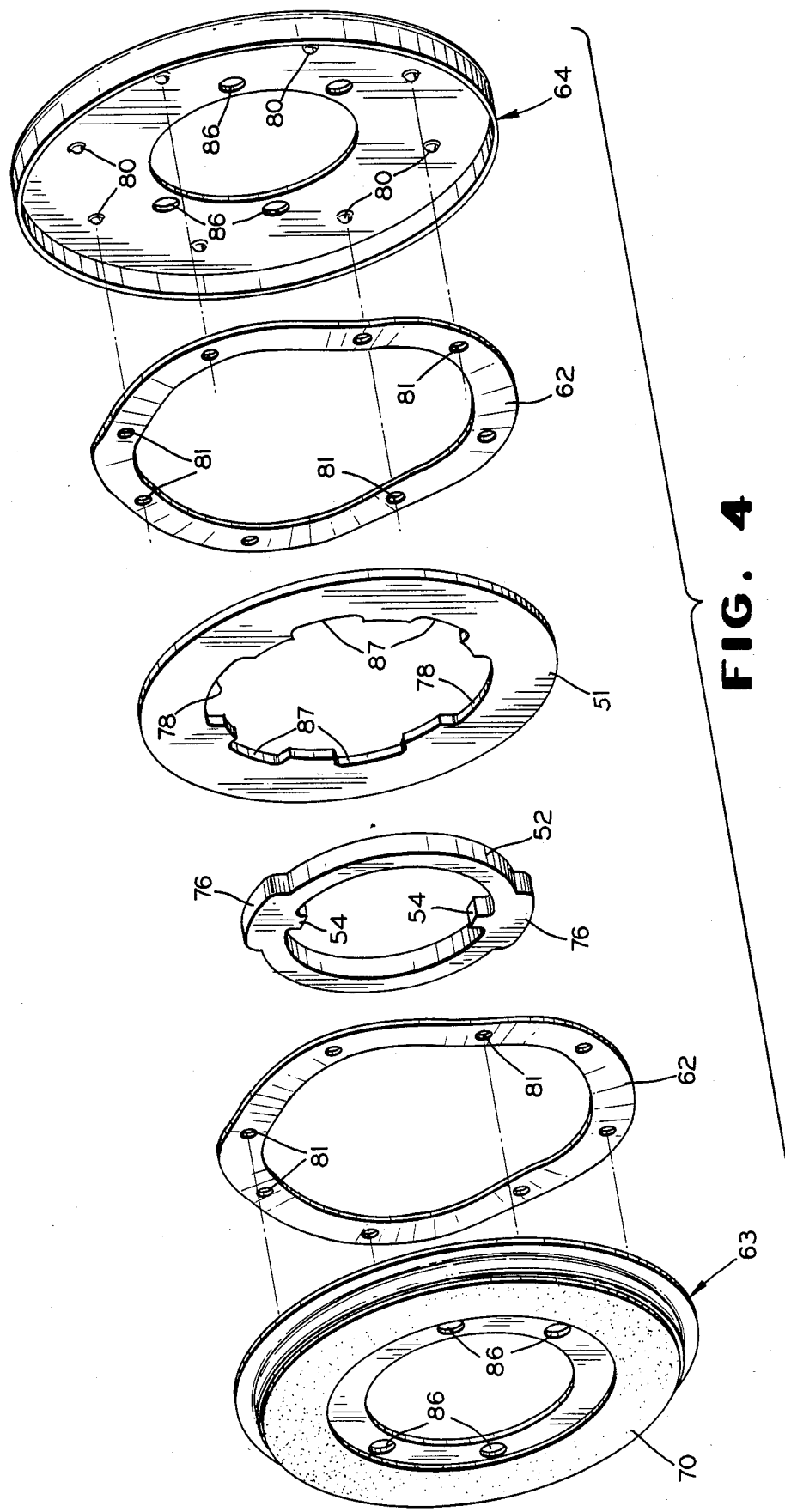
FIG. 4 is an exploded isometric view of the clutch brake of FIG. 1.

Referring to FIG. 4, a positive driving connection between the cover assembly 60 and the wave washers 62 is provided by a series of dimples 80 stamped into the covers 63 and 64 and a corresponding series of holes 81 stamped out of the wave washers 62. Each wave washer has four "waves", with one hole 81 stamped on the top and bottom of each wave (thereby allowing interchangability of the washers without regard to which side faces the covers) for engagement with the dimple 80 of the covers 63 and 64. Alternatively, the holes and dimples could be reversed.

Figure 5:
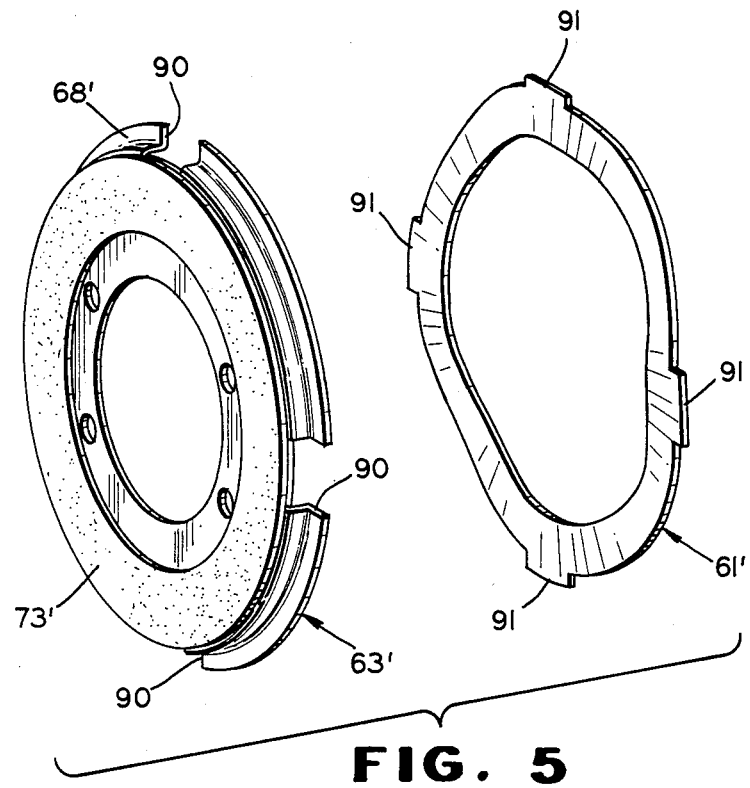
FIGS. 5 and 6 show an alternative embodiment of the present invention.
Figure 6:
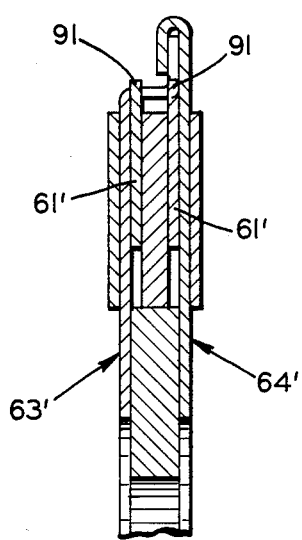

FIGS. 5 and 6 illustrate an alternative drive connection between the cover assembly and the friction members. Stamped annular cover 63' has a central opening, radially outer flange 68' and a friction facing 73 essentially the same as cover 63. The flanges of covers 63' and 64' are rolled together (see FIG. 6), as previously described for covers 63 and 64. Cover 63' has four equally spaced slots 90 which receive four corresponding tabs 91 on wave washers 61'. It should be noted that both wave washers 61' are identical and fit into the slots 90 of cover 63'. The cover 64' has no slots in the alternative embodiment of FIG. 6. Of course, many other variations of the slots and tabs are within the scope of this invention.

The clutch brake 50 has four holes 86 in each cover 63 and 64 to facilitate proper alignment of the lost moton connection upon assembly. The intermediate plate includes four corresponding elongated slots 87 on its inner periphery aligned with the holes 86 to allow an alignment tool to enter the clutch brake through one or more of the holes 86 to center the brake washer drive lugs 76 in the intermediate plate drive slots 78.

In operation, the clutch brake 50 is brought into engagement with and is loaded or compressed between the release bearing 40 and transmission bearing cap 30, thereby impeding rotation of the driven shaft 28. The resilient wave washers 62 allow only a controlled amount of torque to pass from the cover assembly 60 to the inner brake assembly 55. When the predetermined torque load is exceeded the frictional driving connection between the wave washers 62 and the intermediate plate 51 begins to slip, whereby no further increased load can pass to the inner brake assembly.

The frictional slippage results in frictional heat build up, much of which is absorbed by the intermediate plate 61 because of its heat sink characteristics. The heat sink in the inner brake assembly 55 allows the cover assembly 60 to operate more coolly, thereby prolonging the life of the friction facings 70.

Although the above description relates to a presently preferred embodiment, numerous modifications may be made without departing from the spirit of the invention as defined in the following claims.

What we claim is:

1. In a torque limiting friction device said friction device comprising a brake assembly for driving engagement with a shaft, and said friction device further comprising a cover assembly having an outer surface engagable with a non-rotatable surface, means for mounting said cover assembly for relative rotation on said brake assembly and a torque limiting mechanism which drivingly connects said brake assembly and said cover assembly up to a predetermined torque applied between said brake assembly and said cover assembly, an improvement wherein said torque limiting mechanism comprises a resilient friction member positively engaged with said cover assembly and frictionally engaged with said brake assembly wherein said predetermined torque is established substantially solely by friction between said resilient friction member and said brake assembly.

2. A friction device as defined in claim 1 wherein said friction member is axially resilient and wherein said brake assembly further comprises a radially extending intermediate plate fricitonally engaged with said axially resilient friction member.

3. A friction device as defined in claim 2 wherein said axially resilient friction member is a wave washer.

4. A friction device as defined in claim 2 further comprising a second friction member positively engaged with said cover assembly and frictionally engaged with said brake assembly.

5. A friction device as defined in claim 4 wherein said intermediate washer extends between and is frictionally engaged by said axially resilient friction member and said second friction member.

6. A friction device as defined in claim 5 wherein said axially resilient friction member and said second friction member are wave washers.

7. A friction device as defined in claim 2 wherein said cover assembly and said axially resilient friction member are positively engaged via a dimple on said cover assembly and a hole in said friction member.

8. A friction device as defined in claim 2 wherein said cover assembly and said axially resilient friction member are positively engaged via a slot in said cover assembly and a tab on said friction member.

9. A friction device as defined in claim 2 wherein said intermediate washer is comprised of a friction material.

10. A friction device as defined in claim 9 wherein said intermediate washer is comprised of a heat sink material.

11. A friction device as defined in claim 2 wherein said brake assembly comprises a brake washer drivable by said shaft, wherein said cover assembly is rotatably mounted on said brake washer.

12. A clutch brake as defined in claim 11 further comprising an intermediate washer drivingly connected to said brake washer by a lost motion coupling.

13. A friction device as defined in claim 12 wherein said lost motion coupling comprises a radially extending tongue connected to said brake washer and a circumferentially extending slot on said intermediate washer.

14. A clutch brake as defined in claim 13 further comprising means on said cover assembly for adjusting said lost-motion coupling.

15. In a friction device comprising a brake assembly positively drivingly engageable with a shaft, and a cover assembly frictionally engaged with said brake assembly and mounted on said brake assembly for relative rotation with said brake assembly after a predetermined relative torsional force exists between said cover assembly and said brake assembly, an improvement wherein said brake assembly comprises an intermediate washer extending radially into said cover assembly and said cover assembly comprises an axially resilient frictional member rotationally stationary with respect to said cover assembly and in frictional engagement with said intermediate washer wherein said predetermined relative torsional force is established by friction between said intermediate washer and said frictional member.

16. A brake assembly for a clutch, said clutch brake assembly for cooperating with a rotatable driven shaft and a non-rotatable housing comprising:

a cover assembly engagable with the stationary housing, said cover assembly including axially spaced cover members;

friction means disposed between said covers, said friction means including an intermediate washer and resilient means located on opposite sides of the intermediate washer;

an inner brake positively drivingly engagable with said rotatable driven shaft and drivingly connected to said intermediate washer by a lost-motion coupling connection;

means for drivingly connecting the resilient means and the cover members;

said resilient means frictionally engaging said intermediate washer for selectively transmitting rotation from said resilient means to said cover assembly and providing a preload with respect to said cover assembly for retarding rotation of said inner brake when the cover assembly engages said stationary housing, wherein said resilient means are free to slip relative to said intermediate washer when the load applied by said stationary housing exceeds the preload.

* * * * *